(No Model.) 4 Sheets—Sheet 2.
A. & L. CHRONIK.
SHUTTER FOR PHOTOGRAPHIC CAMERAS.
No. 416,440. Patented Dec. 3, 1889.
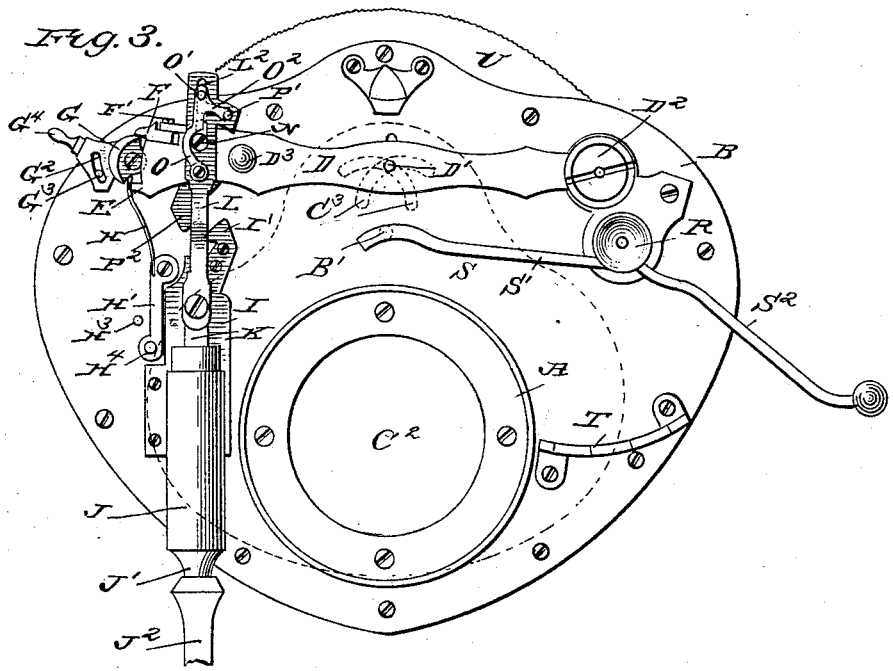
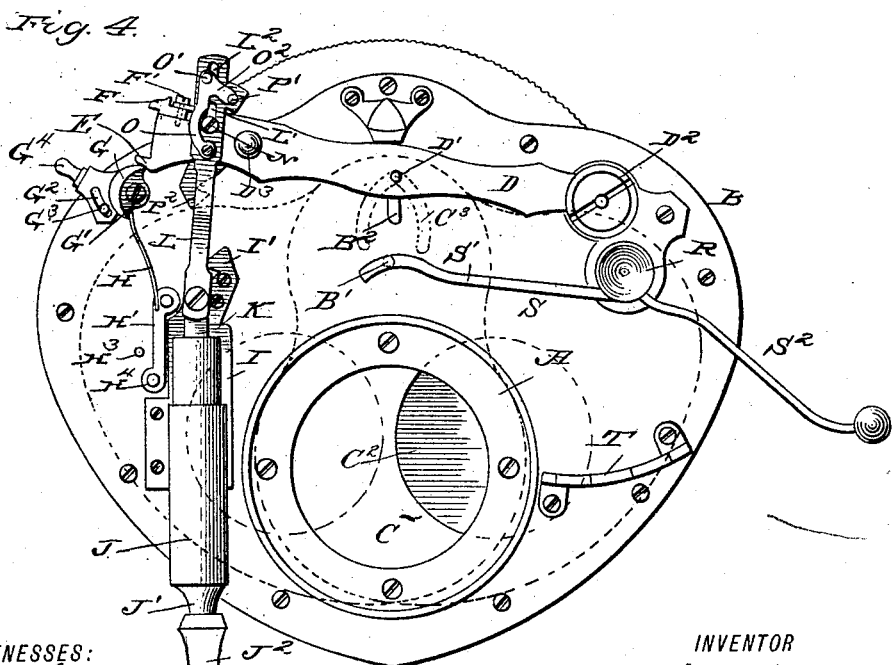
WITNESSES:
W. R. Davis
C. Sedgwick
INVENTOR
A. Chronik
L. Chronik
BY Munn & Co.
ATTORNEY (No Model.) 4 Sheets—Sheet 3.

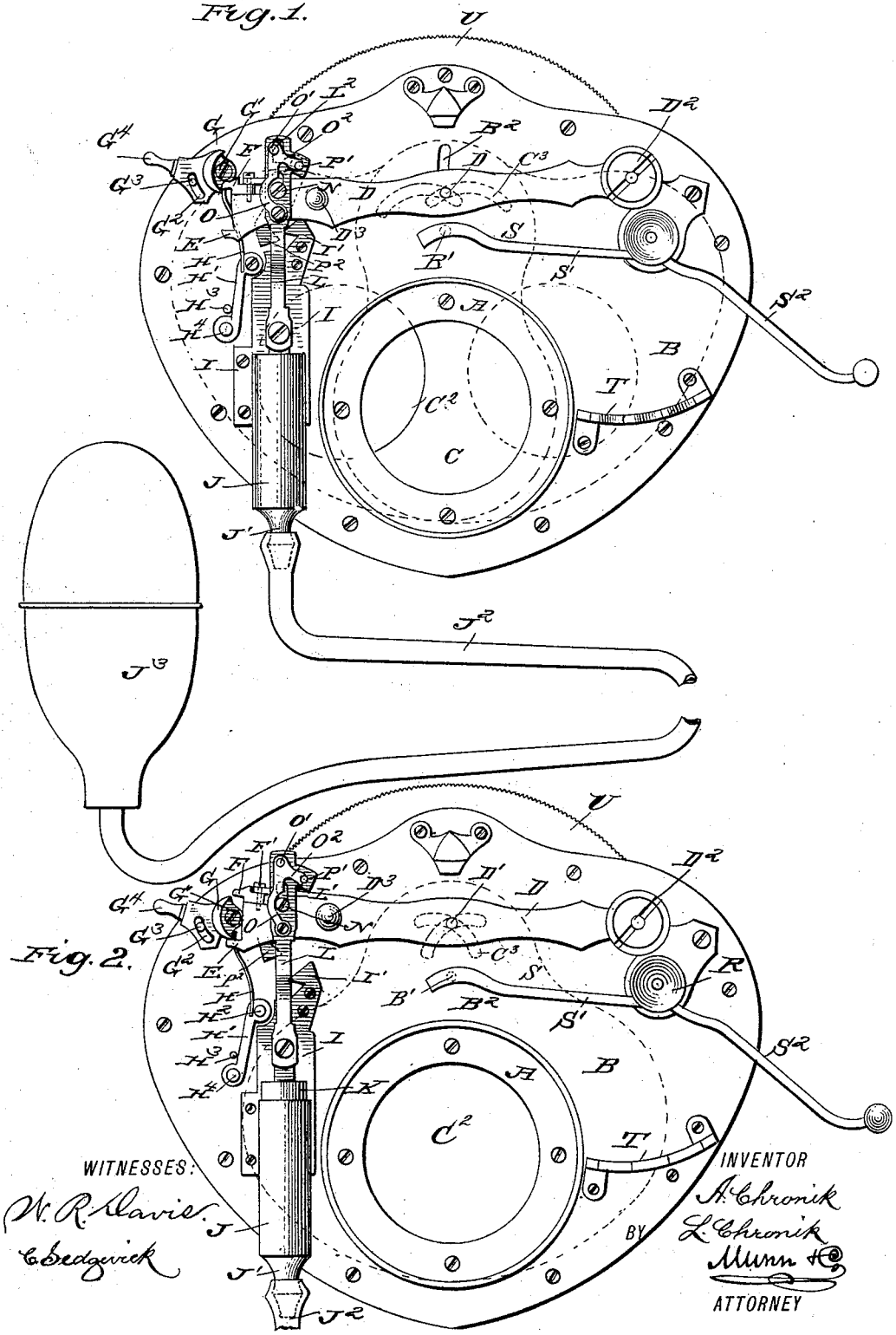

A. & L. CHRONIK.
SHUTTER FOR PHOTOGRAPHIC CAMERAS.

No. 416,440. Patented Dec. 3, 1889.

WITNESSES:
W. R. Davis
C. Sedgwick

INVENTOR
A. Chronik
BY L. Chronik
Munn &Co
ATTORNEY

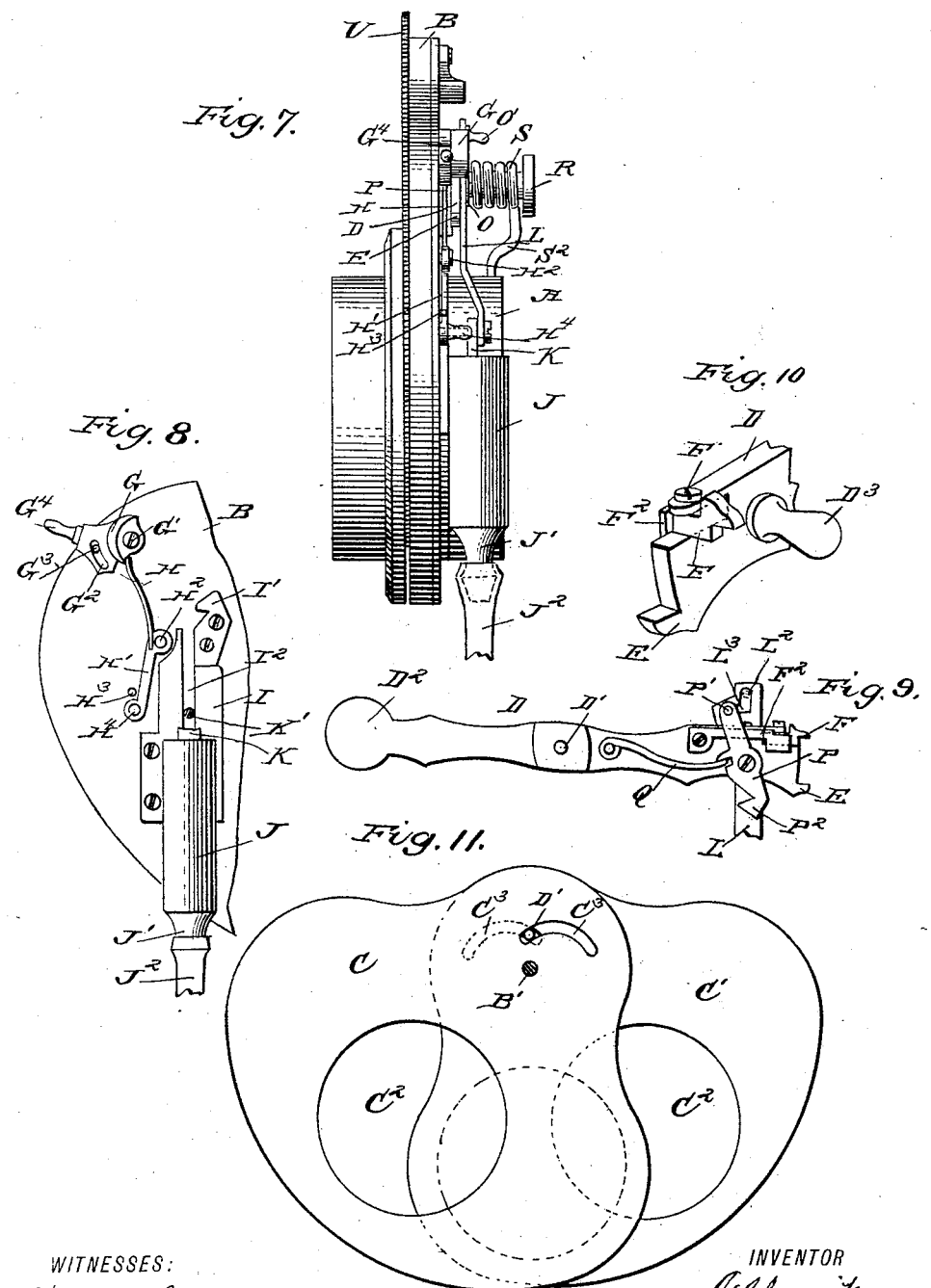

UNITED STATES PATENT OFFICE.

AUGUST CHRONIK AND LOUIS CHRONIK, OF NEW YORK, N. Y.

SHUTTER FOR PHOTOGRAPHIC CAMERAS.

SPECIFICATION forming part of Letters Patent No. 416,440, dated December 3, 1889.

Application filed February 21, 1889. Serial No. 300,698. (No model.)

*To all whom it may concern:*

Be it known that we, AUGUST CHRONIK and LOUIS CHRONIK, both of the city, county, and State of New York, have invented a new and Improved Shutter for Photographic Cameras, of which the following is a full, clear, and exact description.

The object of the invention is to provide a new and improved shutter for photographic cameras which is easily regulated, does not jar the camera when operated, and serves to make any desired time-exposure, or a slow or rapid "instantaneous" exposure.

The invention consists, principally, of an escapement of special construction for adapting the shutter for general use.

The invention also consists of certain parts and details, and combinations of the same, as will be fully described hereinafter, and then pointed out in the claims.

Reference is to be had to the accompanying drawings, forming a part of this specification, in which similar letters of reference indicate corresponding parts in all the figures.

Figure 5:
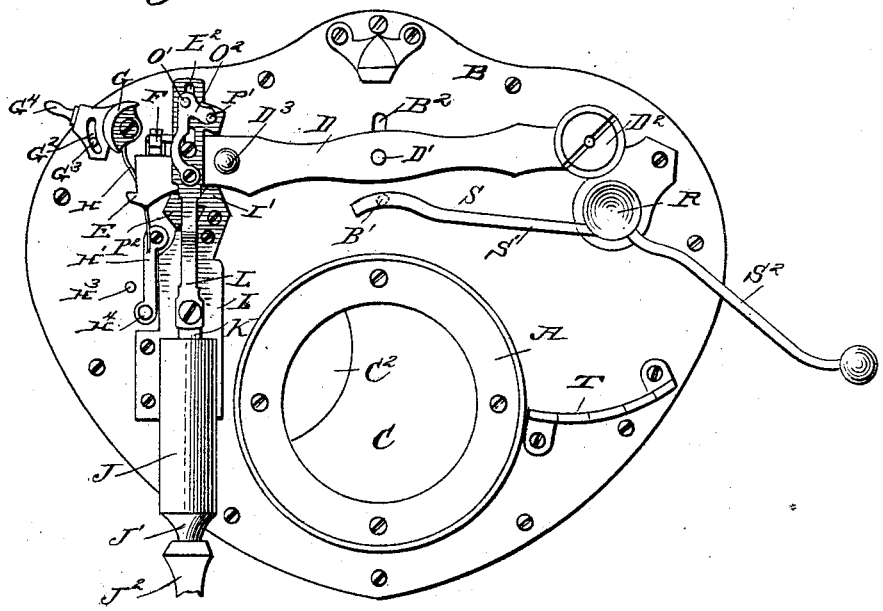
Figure 6:
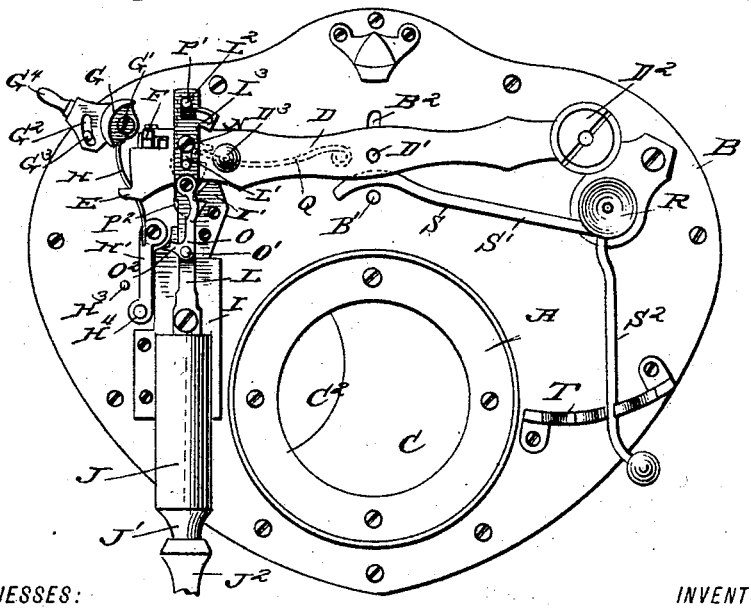

Figure 1 is a front elevation of the improvement in position ready for ordinary time-exposures and with the shutters closed. Fig. 2 is a like view of the same with the shutters held open by pneumatic pressure. Fig. 3 is a front elevation of the improvement in position for a long time-exposure. Fig. 4 is a like view of the same in the uppermost position. Fig. 5 is a front elevation of the improvement in position for a slow instantaneous exposure. Fig. 6 is a like view of the improvement in position for a rapid instantaneous exposure. Fig. 7 is an end elevation of the improvement. Fig. 8 is a front elevation of part of the improvement. Fig. 9 is a rear elevation of the lever and adjacent parts. Fig. 10 is an enlarged perspective view of the rear end of the lever, and Fig. 11 is a front elevation of the shutters.

The improvement is provided with the usual camera-tube A, intersected by a casing B, in which are pivoted on a pin B' two shutters C and C', each provided in its middle with a circular opening $C^2$. Directly above the pivot-pin B' of the shutters C and C' are formed the segmental slots $C^3$ in the shutters C and C', and through the same passes a pin D', also projecting through a slot $B^2$ in the front plate of the casing B. The pin D' is secured to the rear of the lever D, fulcrumed at $D^2$ to the front plate of the casing B, and the said lever is also provided with a handle $D^3$ for conveniently moving the lever. The shutters C and C' are arranged in such a manner that when the shutters are in the position shown in Figs. 1 and 11 the camera-tube A is closed, and when the lever D is moved upward the shutters C and C' move toward each other until the circular apertures $C^2$ register with each other in line with the camera-tube A, as shown in Figs. 2 and 3. The circular apertures $C^2$ then pass each other, and when the lever D is in its uppermost position, as shown in Fig. 4, the camera-tube A is again closed.

On the free end of the lever D is formed a fixed lug E, near its bottom, and directly above this lug E is held a lug F, pivoted at F' to the lever D and adapted to swing outward, being held in either position by a spring $F^2$, secured to the rear of the lever D, as is plainly shown in Fig. 9. The lugs E and F are adapted to operate on a crescent-shaped escapement G, pivoted at G' to the front of the casing B and provided with a segmental slot $G^2$, through which passes a pin $G^3$, secured on the front of the casing B and serving to limit the swinging motion of the pivoted escapement G. A short handle $G^4$ is also secured on the escapement for conveniently setting it whenever desired. A spring H is adapted to press against one edge of the escapement G, so as to hold it in its uppermost position. The spring H is secured to a lever H', fulcrumed at $H^2$ on the front of the casing B, and moving between the stop $H^3$ and the plate I, both secured on the casing B. The lever H' is also provided with an outwardly-projecting handle $H^4$, for conveniently manipulating said lever whenever desired.

On the plate I is fastened or formed a small pneumatic cylinder J, open at its upper end and provided at its lower end with a tubulated plug J', which receives a rubber tube $J^2$, communicating with a flexible bulb $J^3$. In the open end of the cylinder J is inserted a piston K, pivotally connected with a link L, provided with a slot L', through which passes a pin or screw N, secured to the lever D. The pin or screw N is adapted to be engaged by a curved lever O, fulcrumed on the link L and provided near its upper end with a handle O', for conveniently manipulating said lever O. The rear end of the handle O' projects slightly, and is adapted to engage a slot $L^2$, formed in the extreme upper end of the link L.

From the lever O projects a short arm $O^2$, the outer end of which is semicircular and is adapted to engage a pin P', passing through a segmental slot $L^3$, formed in the link L and in communication with the vertical slot $L^2$, before mentioned. (See Fig. 9.) The pin P' is fastened on the upper end of a lever P, fulcrumed on the lever D and engaged by a spring Q, fastened on the lever D and serving to hold said lever P in a certain position, hereinafter more fully described. The lower end of the lever P is provided with a hook $P^2$, (see Fig. 9,) adapted to engage a similarly-shaped hook I', formed on the upper end of the plate I. The latter is also provided with a guideway $I^2$, into which projects the connecting-pin K', connecting the piston K with the link L.

On the front of the casing B is secured a stud R, on which is coiled a spring S, provided with an arm S', extending between the top of the camera-tube A and the under side of the lever D. Said spring S is also provided with an arm $S^2$, adapted to engage a notched segment T, secured on the front of the casing B. When the spring S is in the position shown in Fig. 1, the arm S' is disengaged from the lever D and the arm $S^2$ is disengaged from the notched segment T. When the arm $S^2$, however, is moved on the notched segment T, the other arm S' is pressed against the under side of the lever D, so that the spring then has the tendency to press the lever D upward. The force with which the lever D is pressed by the spring can be regulated by moving the arm $S^2$ into a corresponding notch of the segment T.

On the rear of the casing B is pivoted the usual stop-plate provided with apertures of varying diameters adapted to register with the camera-tube A.

The operation is as follows: When the apparatus is to be used for ordinary time-exposures the several parts are placed in the position shown in Fig. 1, the spring S is entirely disconnected from the lever D, and the lever H is swung outward against the stop-pin $H^3$, so that the upper end of the spring H disengages the escapement G. The latter by its own weight assumes the position shown in Figs. 1 and 2—that is, the pin $G^3$ is in the upper end of the segmental slot $G^2$ and the lower end of the crescent-shaped escapement G is placed between the lugs E and F, so that the upward and downward motion of the lever D is limited to the travel of the lugs E and F on the lower end of the crescent-shaped escapement G. The weight of the lever D and its connections with the piston K cause said lever to remain in a lowermost position, so that the shutters C and C' close the camera-tube A. Now, when the operator presses on the flexible bulb $J^3$ air is forced through the tube $J^2$ into the lower end of the cylinder J and against the piston K, so that the latter is forced upward, and, by the link L and the pin N, causes an upward motion of the said lever D until the lower lug E strikes against the under side of the lower end of the crescent-shaped escapement G, as is plainly shown in Fig. 2. The moment the lug E strikes the escapement G the circular apertures $C^2$ in the shutters C and C' register with each other and with the camera-tube A. The shutters remain in this position until the operator releases his pressure on the flexible bulb $J^3$, after which the weight of the lever D and its connections causes it to swing downward to its former position, thereby again closing the shutters C and C'. The length of time for holding the shutters open depends on the length of time that the operator presses on the flexible bulb $J^3$. When the operator desires to make a long time-exposure without holding the bulb $J^3$ for such a length of time, he throws the lever H' inward into the position shown in Fig. 3, so that the spring H presses the escapement G into its uppermost position. In order to set the device for such an exposure, the operator moves the lever D into its lowermost position, as shown in Fig. 1, whereby the camera-tube A remains closed. The upper lug F is now below the upper end of the crescent-shaped escapement G, and the said upper end is thrown inward considerably by the action of the spring H, while the lower end is thrown outward, as is shown in Fig. 3. Now, when the operator presses on the flexible bulb $J^3$ the piston K is again moved upward, imparting an upward-swinging motion to the lever D, so that the upper lug F of the latter passes on the inner curved face of the escapement G against and over the upper end of the said escapement, thereby swinging the latter downward, so that its lower end swings inward and over the lug E, thus arresting the upward motion of the lever D. As soon as the operator releases his pressure on the bulb $J^3$ the spring H again forces the escapement G upward, so that the upper end of the said escapement engages the lower edge of the upper lug F, as is plainly shown in Fig. 3. The openings $C^2$ of the shutters C and C' now register with the camera-tube A, and the lever D is prevented from moving downward by the escapement G. After a certain length of time has elapsed and the operator desires to close the camera-tube A, he again presses on the flexible bulb $J^3$, so that the piston K is caused to travel still farther upward, thereby imparting an upward-swinging motion to the lever D, which now is free to swing upward, its end lug E passing over the upper end of the escapement G, which latter yields to let the lug E pass, and then falls back to its former position, so that the upper end of the escapement passes under the bottom of the lug E, and consequently locks the lever D in place. (See Fig. 4.) While the lever D travels to this last position, the shutters C and C' again close the camera-tube A, as shown in Fig. 4. When the operator desires to make a slow instantaneous exposure, he first turns the lug F to the front, at an angle of ninety degrees, into the position shown in Figs. 5, 6, and 10. The spring $F^2$ holds the said lug F in a similar position. The lever H' remains in the position it had last, and when the operator moves the lever D downward into the position shown in Fig. 5 the shutters C and C' close the camera-tube A. When the operator now presses upon the bulb $J^3$, the piston K is forced upward its full stroke, so that the shutters C and C' swing toward each other, whereby the apertures $C^2$ are made to register for a moment with the tube A, after which the shutters again close said tube, and the lever D is then in its uppermost position. It will be understood that the lug F, being out of the way of the escapement G, the lever D is free to move upward until the lug E has passed the yielding escapement G, after which the latter engages the lower end of the lug E and locks the lever D in place in the same manner as before described, and shown in Fig. 4. Thus by hard or easy pressure on the bulb $J^3$ the operator is enabled to make an instantaneous exposure, which is more or less rapidly terminated. For a very rapid instantaneous exposure, the operator brings the lever S into use and adjusts the arm $S^2$ in one of the notches of the segment T. The other arm S' then presses against the under side of the lever D to force the latter upward. The operator now takes hold of the handle O' of the lever O and disengages the projecting rear end of the handle from the notch $L^2$ in the link L and then swings said lever O downward into the position shown in Fig. 6. The moment the operator commences to swing the lever O outward the spring Q, acting on the lever P, causes the same to swing on its pivot, so that the pin P' passes into the vertical slot $L^2$ of the link L. The operator also moves the lug F into the position it previously occupied and as shown in Figs. 5 and 10. The lever H' also remains in the position it previously held, and the operator now takes hold of the handle $D^3$ and at the same time presses on the handle $G^4$ of the escapement G, so that the lug E can pass the upper and lower ends of the said escapement. When the lever D is moved to its lowermost position, the operator takes hold of the handle O' of the lever O, and presses downward, so that the link L, with the piston K, is moved downward and the pin P' passes into the upper end of the slot $L^2$, while the lever D remains stationary and its pin N passes into the upper end of the slot L'. As soon as the pin P' has passed into the upper end of the slot $L^2$ the pin P' is locked in place and stands in a vertical position, so that its hook $P^2$ engages the hook I', thereby locking the lever D, the link L, and the piston K in place. The lever D is now in its lowermost position and the camera-tube A remains closed by the shutters C and C', and the spring S exerts an upward pressure against the lever D. The several parts of the device are now in the position shown in Fig. 6. The moment the operator now presses on the flexible bulb $J^3$ the piston K is moved upward, so that the link L slides a short distance in the same direction until the pin P' is in line with the segmental slot $L^3$, the spring S exerting its pressure against the lever D, so that the hook I' causes the lever P to swing until the hook $P^2$ is disengaged from the hook I', after which the lever D is free to swing upward and is forced in this direction by the action of the spring S. The lever D now makes its full stroke, so that the circular openings $C^2$ register with the camera-tube A and are again disconnected from the same by the time the lever D reaches its uppermost position. A very rapid instantaneous exposure can thus be made. It will be seen that the shutters C and C' are fulcrumed on a common pivot B', and by the peculiar arrangement of the openings $C^2$ and the segmental slots $C^3$ operates simultaneously in the manner above described. Thus it will be seen that the camera-shutter, as described, is adapted for all kinds of work from a slow exposure to a very rapid one, as desired. The tension of the spring S is increased or diminished by resting the arm $S^2$ nearer to or farther from the tube A.

Having thus described our invention, what we claim as new, and desire to secure by Letters Patent, is—

1. In a photographic-camera shutter, the combination, with the camera-tube and a casing held thereon, of a pivot-pin secured in the said casing, two similar shutters, both pivoted on the said pin and each provided with a central opening and a segmental slot, a pin engaging both segmental slots, a lever fulcrumed on the said casing and carrying the said pin, and an escapement engaging the lever for controlling the movement thereof, substantially as shown and described.

2. In a photographic-camera shutter, the combination, with the camera-tube and a casing held thereon, of a pivot-pin secured in the said casing, two similar shutters both pivoted on the said pin and each provided with a central opening and a segmental slot, a pin engaging both segmental slots, a lever fulcrumed on the said casing and carrying the said pin, an escapement engaging the lever for controlling the movement thereof, and means, substantially as described, for operating the said lever, as set forth.

3. In a photograpic-camera shutter, the combination, with a lever for operating the shutters and provided on its free end with two lugs, of a pivoted crescent-shaped escapement operating on the said lugs for controlling the motion of the said lever, substantially as shown and described.

4. In a photographic-camera shutter, the combination, with a lever for operating the shutters and provided on its free end with two lugs, of a pivoted crescent-shaped escapement operating on the said lugs for controlling the motion of the said lever, and a spring adapted to engage the said escapement to change the relative position between the ends of the crescent-shaped escapement and the said lugs, substantially as shown and described.

5. In a photographic-camera shutter, the combination, with a lever for operating the shutters and provided on its free end with two lugs, of a pivoted crescent-shaped escapement operating on the said lugs for controlling the motion of the said lever, and a spring adapted to engage the said escapement to change the relative position between the ends of the crescent-shaped escapement and the said lugs, and a lever carrying the said spring to throw the latter in and out of contact with the said crescent-shaped escapement, substantially as shown and described.

6. In a photographic-camera shutter, a lever for operating the shutters and provided with a fixed lug and a pivoted lug, substantially as shown and described.

7. In a photographic-camera shutter, a lever for operating the shutters and provided with a fixed lug and a pivoted lug, in combination with a spring fastened on the said lever and pressing with its free end on the said pivoted lug to hold it in either a sidewise or front position, substantially as shown and described.

8. In a photographic-camera shutter, the combination, with a lever for operating the shutters and provided with a fixed lug and a pivoted spring-pressed lug, of a pivoted crescent-shaped escapement operating on one or both of the said lugs to control the motion of the said lever, substantially as shown and described.

9. In a photographic-camera shutter, the combination, with a lever for operating the shutters and provided with a fixed lug and a pivoted spring-pressed lug, of a pivoted crescent-shaped escapement operating on one or both of the said lugs to control the motion of the said lever, and a spring adapted to engage the said escapement to change its position relative to the said lugs, substantially as shown and described.

10. In a photographic-camera shutter, the combination, with a lever for operating the shutters and provided with a fixed lug and a pivoted spring-pressed lug, of a pivoted crescent-shaped escapement operating on one or both of the said lugs to control the motion of the said lever, a link pivotally connected with the said lever, a piston connected with the said link, and a pneumatic cylinder in which operates said piston, substantially as shown and described.

11. In a photographic-camera shutter, the combination, with a lever for operating the shutters and provided with a fixed lug and a pivoted spring-pressed lug, of a pivoted crescent-shaped escapement operating on one or both of the said lugs to control the motion of the said lever, a link pivotally connected with the said lever, a piston connected with the said link, a pneumatic cylinder in which operates the said piston, and a curved lever fulcrumed on the said link and serving to lock the pivot-pin of the latter in place on the said lever, substantially as shown and described.

12. In a photographic-camera shutter, the combination, with a spring-pressed lever operating the shutters, of a pin secured on the said lever, a link provided with a slot into which projects the said pin, a piston connected with the said link, a pneumatic cylinder in which operates the said piston, and a spring-pressed hook pivoted on the back of the said lever and adapted to engage a fixed hook, substantially as shown and described.

13. In a photographic-camera shutter, the combination, with a spring-pressed lever operating the shutters, of a pin secured on the said lever, a link provided with a slot into which projects the said pin, a piston connected with the said link, a pneumatic cylinder in which operates the said piston, a spring-pressed hook pivoted on the back of the said lever and adapted to engage a fixed hook, and a pin projecting from the said pivoted hook and engaging an L-shaped slot in the said link, substantially as shown and described.

14. In a photographic-camera shutter, the combination, with a spring-pressed lever operating the shutters, of a pin secured on the said lever, a link provided with a slot into which projects the said pin, a piston connected with the said link, a pneumatic cylinder in which operates the said piston, a spring-pressed hook pivoted on the back of the said lever and adapted to engage a fixed hook, a pin projecting from the said pivoted hook and engaging an L-shaped slot in the said link, and a pivoted crescent-shaped escapement adapted to engage a lug on the said lever to lock the latter in an uppermost position, substantially as shown and described.

15. In a photographic-camera shutter, the combination, with a spring-pressed lever operating the shutters, of a pin secured on the said lever, a link provided with a slot into which projects the said pin, a piston connected with the said link, a pneumatic cylinder in which operates the said piston, a spring-pressed hook pivoted on the back of the said lever and adapted to engage a fixed hook, a pin projecting from the said pivoted hook and engaging an L-shaped slot in the said link, a pivoted crescent-shaped escapement adapted to engage a lug on the said lever to lock the latter in an uppermost position, and a spring engaging the said pivoted escapement to hold it in position, substantially as shown and described.

16. In a photographic-camera shutter, the combination, with a fixed hook, of a spring-pressed lever operating the shutters, a second lever provided with a hook and pivoted on the said spring-pressed lever, a pin secured on the said spring-pressed lever and engaging the said second lever, a pin held on the second lever, a link pivotally connected with the said spring-pressed lever and held to slide on the same, the said link being also provided with an L-shaped slot into which projects the said pin, substantially as shown and described.

17. In a photographic-camera shutter, the combination, with a fixed hook, of a spring-pressed lever operating the shutters, a second lever provided with a hook and pivoted on the said spring-pressed lever, a pin secured on the said spring-pressed lever and engaging the said second lever, a pin held on the second lever, a link pivotally connected with the said spring-pressed lever and held to slide on the same, the said link being also provided with an L-shaped slot into which projects the said pin, and a curved lever fulcrumed on the said link and adapted to lock the said pin in one end of the said L-shaped slot, so as to hold the said hooks disengaged, substantially as shown and described.

AUGUST CHRONIK.
LOUIS CHRONIK.

Witnesses:
THEO. G. HOSTER,
EDGAR TATE.